United States Patent
Naneff et al.

(10) Patent No.: US 11,971,198 B2
(45) Date of Patent: Apr. 30, 2024

(54) ADVANCED REINFORCEMENT DESIGN FOR MULTIFUNCTION CONCRETE WASTEPIPES

(71) Applicant: Renewable Resource Recovery Corp., Sudbury (CA)

(72) Inventors: Boris P. Naneff, Sudbury (CA); John D. Hood, Sudbury (CA); Les Lisk, Coniston (CA)

(73) Assignee: Renewable Resource Recovery Corp., Sudbury (CA)

( * ) Notice: Subject to any disclaimer, the term of this patent is extended or adjusted under 35 U.S.C. 154(b) by 169 days.

(21) Appl. No.: 17/831,406

(22) Filed: Jun. 2, 2022

(65) Prior Publication Data

US 2023/0213244 A1    Jul. 6, 2023

Related U.S. Application Data

(60) Provisional application No. 63/295,843, filed on Dec. 31, 2021.

(51) Int. Cl.
| | |
|---|---|
| *F24T 10/15* | (2018.01) |
| *C04B 28/04* | (2006.01) |
| *C04B 28/08* | (2006.01) |
| *E03C 1/00* | (2006.01) |
| *F24D 17/00* | (2022.01) |
| *F28D 21/00* | (2006.01) |

(52) U.S. Cl.
CPC .............. *F24T 10/15* (2018.05); *C04B 28/04* (2013.01); *C04B 28/08* (2013.01); *E03C 1/00* (2013.01); *F24D 17/0005* (2013.01); *F28D 21/0012* (2013.01); *E03C 2001/005* (2013.01); *F24D 2200/11* (2013.01); *F24D 2200/12* (2013.01); *F24D 2200/20* (2013.01)

(58) Field of Classification Search
CPC .. F24T 10/15; F24D 17/0005; F24D 2200/11; F24D 21/0012; E03C 2001/005
USPC ..................................................... 165/104.14
See application file for complete search history.

(56) References Cited

U.S. PATENT DOCUMENTS

| | | | |
|---|---|---|---|
| 10,598,412 B2 * | 3/2020 | Jacobi | F25B 25/005 |
| 11,326,830 B2 * | 5/2022 | Jacobi | F25D 19/02 |
| 11,493,227 B2 * | 11/2022 | Jacobi | F28D 7/16 |
| 2006/0242983 A1 * | 11/2006 | Spadafora | F24T 10/10 165/45 |
| 2010/0236750 A1 | 9/2010 | Naneff et al. | |
| 2013/0037236 A1 * | 2/2013 | Saunier | F24D 3/18 165/45 |

* cited by examiner

*Primary Examiner* — Jon T. Schermerhorn, Jr.
(74) *Attorney, Agent, or Firm* — M. Conrad Huffstutler; M. Conrad Huffstutler, Jr.

(57) ABSTRACT

This application discloses an advanced design method for customized RCP, (cRCP), with one or more made-to-order reinforcement cages supporting one or more wall-encapsulated heat-exchange channels, cast with special-batch (SB) concrete having additions of fine-disperse $CaCO_3$ and particular polymer fibers; the resulting Single- and DoubleEPipe sections especially adapted for heat exchange with pipe-internal wastestreams and/or groundwater and including provisions for an optional graywater accumulator for efficient recapture of both water and energy.

6 Claims, 7 Drawing Sheets

ADVANCED REINFORCEMENT DESIGN FOR MULTIFUNCTION CONCRETE WASTEPIPES

CROSS-REFERENCE TO RELATED APPLICATION

This application claims the benefit of U.S. Provisional Patent Application No. 63/295,843 filed 31 Dec. 2021 and incorporates such provisional patent application in its entirety by reference.

FEDERALLY SPONSORED RESEARCH

Not Applicable

SEQUENCE LISTING

Not Applicable

BACKGROUND OF THE INVENTION

Several classic geothermal-heat-pump systems are known; these typically provide space heating for a building or residence using energy from local soil and ground water. Use of a heat pump to exchange heat with geothermal sources at about $280<temp, K<360$ is a known technology which may be used along with the present invention. Various attempts to activate deep-well-geothermal sources (~3 km deep, hot-dry-rock well) have caused public concern as a probable risk of induced seismic activity, for example the magnitude 5.4 (Modified Mercalli) earthquake in Pohang, South Korea in 2017. If geothermal harvesting is practiced nearby, certain buried reinforced concrete pipe (RCP) sewers may also be at risk of overstress due to anomalous subsidence or possible tremblors; such situations call for modern analysis of updated-reliable evidence rather than handbook rules.

FIELD OF THE INVENTION

The present invention is a heat exchange (HE) system to facilitate exchanges of heat between a building system (such as its HVAC equipment) and waste streams related to its human occupants, including sections of buried, custom-reinforced concrete pipe (cRCP), including the private lateral(s) and adjacent portions of the community sanitary sewer. This cRCP technology has been under continuing development since 2009 and is now of particular interest as a significant possibility for conservation of water and energy.

HE-systems for both graywater (GW) and blackwater (BW) are disclosed; rational, wall-integrated HE-channels are disclosed for custom concrete pipes, GW accumulators and manholes. Modern water-conservation methodology applies GW for sub-surface irrigation and may include tanks, valves, filters, pumps, etc., along with piping toward the receiving landscape; GW is not used in spray irrigation, allowed to pond or runoff, allowed to be discharged directly into storm sewer or any surface body of water. BW is a multiphase wastestream, mainly from human toilets, which must be handled under specific regulations in every community. Disclosed herein is HE-customized cRCP pipe-section apparatus applicable to transport BW and GW streams, which is configurable with known heat pumps, heat exchangers and circulation pumps; the latter are fitted with known temperature and flow rate sensors and controlled by known algorithms for economic HE using updated economic-value inputs for energy expended vs energy exchanged.

DESCRIPTION OF THE RELATED ART

Although careful searching has been done, no patent grant has been found for an article similar to cRCP i.e., for concrete sewer pipe [buried installation] having at least one wall-embedded, helix-wound HDPE heat-exchange (HE) channel each integrated with a 3D reinforcement cage especially adapted for support of one or more independent, customized HE-channels.

Because such pipes typically transport sewage for about 100-150 years, installed lines are precisely specified according to a unique set of chemical, physical and mechanical properties and the final bedded structure [gravity or pumped wasteflow] must also be regularly inspected and approved [for health and safety] by a Registered Engineer.

In 2010, heat exchange between the HVAC system of a public building and adjacent sewer flows was a new concept which had not been explored by Engineers, and an exploratory system was designed for a new residential sub-division. The inventor's explorations into design of unique pipe and reinforcement cages optimized for heat exchange with sewage along with fecal solids, tissue, and chemicals has continued for several years.

Because heat recovery from graywater is an important economic factor in cold climates, it was immediately recognized that the fundamental problem was separation of liquid-only graywater wastes at the source—in every connected apartment, dormitory, hospital, hotel and business. The tech challenge was modeling .both. heat capture and heat rejection with .both. blackwater [solids, liquids and gases] .and. graywater [liquid]. This work has necessitated spreadsheets and other engineering analysis, along with many prototype cRCP sections for destructive testing. In addition to the graywater challenge for wastewater heat recovery, geothermal energy recovery is a similar situation, e.g., there are 30 000 hot springs in JP—the earliest records starting about 725 AD and about half of the flows being at temperatures greater than 42° C. There are also many opportunities for advanced cRCPs expressly designed for roadway-ice melting in major cities such as Hokkaido [about 250 Onsen—hot springs].

Several of the patent documents found apparently depict concrete pipe with cored wall cavities or commercial RCP pipe with an "added-on" internal .or. external array of heat-exchange pipes". None of the documents found discloses reinforcement-cage design and other special measures to strengthen the cRCP concrete wall zones subject to catastrophic wall cracking due to two critical factors: (a) an added smooth "tubular body" .and. missing concrete composition [fully-hydrated mortar, aggregate, steel and other reinforcements] and (b) tensile stresses in the concrete [pipe-wall or slab] due to the strong temperature gradient used for highway ice-melting [using brine from a local hot spring flowing in a stainless tube].

Specifically, JP2000-240029 proposes circulation of "water" from a boiler and/or geothermal sources for ice melting on adjacent highway bridges using "ice-melting pipe sections" along with a heated-slab roadway. For example, effluent from a typical hot spring contains sulfur along with dissolved minerals and is about $340<K<360$; at start-up operation of an ice-melting slab at grade, there would be a temperature gradient of more than 40 K across the wall portion of a commercial RCP pipe .and. the top portion of a concrete slab. FIGS. 1 through 12 [apparently not CAD views] show the "tubing" as plastic-deformed [bent to about 90° angle] at many locations and thus having a radius of curvature less than about 30 mm. These sketches argue that the "tube" design is .either. for a one-piece-formed-metallic component .or. an assembled-in-place-polymer structure with multiple robust elbow fittings. Further, before casting concrete, either option must be sealed and tested for long-term, low-friction, pressurized, turbulent flow of geothermal fluids. Regrettably, the material of the "tube" is not mentioned; neither is the particular pipe-casting process of injecting the concrete across the cages and into a mold with "tube ends" extending outward from the external surface of the bell-tip only.

Concerning the actual "utility" of such "concrete-pipe-sewer-heat-exchange inventions" sketched without dimensions, material properties or heat exchange data, neither a published engineering paper nor evidence of monetization have been found.

BRIEF SUMMARY OF THE INVENTION

Considering the challenges of water shortages in many States and increasing risks of extreme natural phenomena, there is need for advanced-design-heat-exchange systems applicable to modern construction with integrated GW isolation or for replacement of traditional gravity-flow sewer lines.

The present invention is an advanced, custom-designed RCP (cRCP) sewer-pipe-section design for individual pipe sections, each about 1-3 m in length and intended to be connected within a trench into an array for transport of wasteflows. Each section includes one or more independent, wall-encapsulated heat-exchange channels (HEC) for flow of heat-exchange fluid (HEF) circulated from an external loop system which includes a heat pump adapted to transfer heat energy between a nearby building and the waste stream flowing within the array of connected sections. Sections of cRCP with a "Single EPipe" are provided with a single HE-channel positioned for optimal heat exchange with the wasteflow. Sections of "Double EPipe" are provided with two independent HE channels; one may be adapted for efficient wasteside transfer and the other for groundside heat exchange. Control of all heat-transfer parameters, i.e., fluid properties, as well as its instant flow rate and temperature, is under the management and control of the heat pump system and the particular direction of HEF flow in each pipe of the array, is determined by connections made at the time of installation. Because buried sewer line may be subject to tremblors and loads from the adjacent ground sufficient to cause cracks in tension zones, cRCP sections must be provided with special reinforcement cages especially adapted to support increased stress zones surrounding each HEC and to prevent reinforcement damage or major pipe spalling.

BRIEF DESCRIPTION OF THE DRAWINGS

FIG. 2 lower drawing is a schematic close-up view of 2 sections, X and Y, with their HE-channels connected in countercurrent-series manner to exchange heat between the heat pump (22) and the waste stream, usually flowing bell-to-spigot inside the array (49). The small detail shows the minimum bend radius (R) of about 20*OD for HE-channels made of HDPE. The supply and return manifolds, (72a) and (72b) respectively, correspond to connecting portions shown in FIG. 1.

FIG. 3 (upper) shows a schematic section view of the optional manifold cover (59) which extends along the full length of each section to protect all the fluid connections between the system (supply and return headers) and the particular section against damage during backfilling or in-service tremblors such as might be produced by nearby fracking. Each protective cover is sufficient in size and strength and to protect extensions and connections during placement and backfilling; each is attached to its section's top surface by several robust, mating threaded anchor posts (67) and socket holes (59a) as well as by tongue-and-groove end features.

FIG. 3, Section A-A is a transverse schematic section view for an alternative ellipse-like pipe profile (31) which would maintain a greater wetted heat-transfer surface on the wasteside during low-wasteflow periods; for clarity in this view, neither W- or G-type HE-channels are shown, but they would be supported on reinforcement cages appropriate for the size of the particular concrete profile to provide at least 25 mm cover for all the internal-structure elements.

A horizontal cRCP section adapted by length and orientation to hold a volume of at least 2 m³ and having (31) profile would also be an effective alternative configuration for a horizontal GW accumulator (81).

Figure 1:
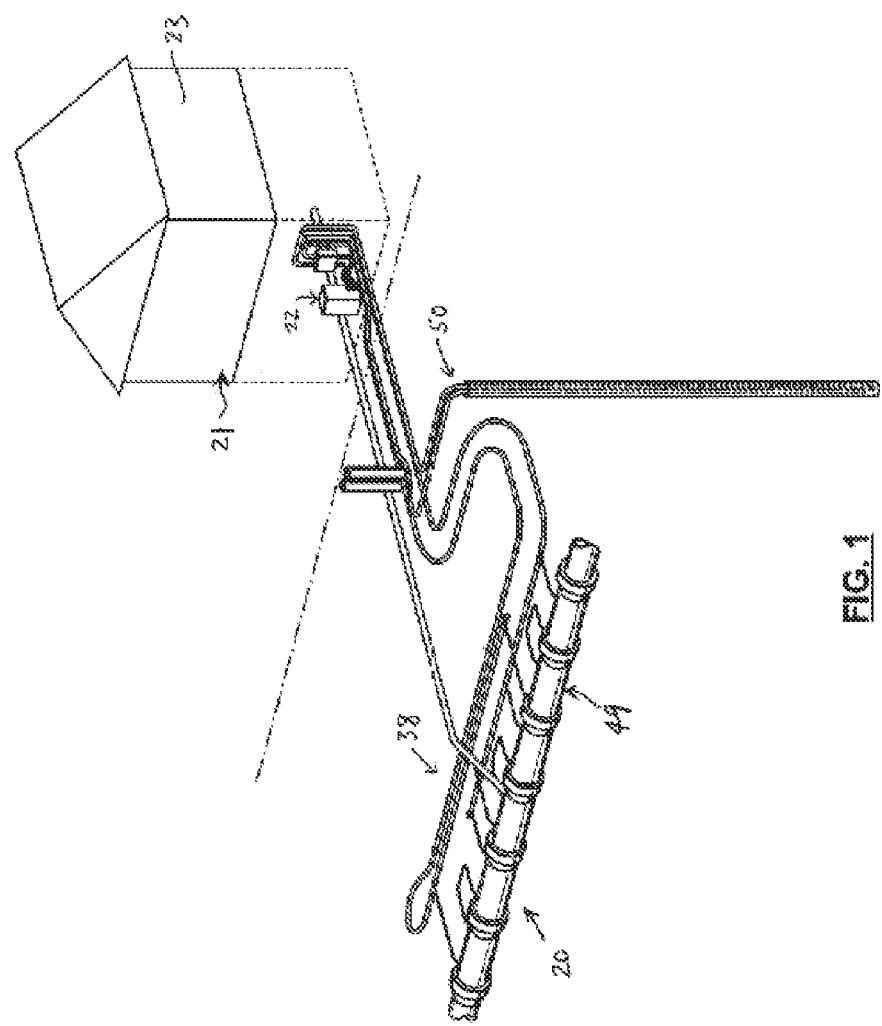
FIG. 1 is an isometric view of an embodiment of a heat exchange system connected to an array of cRCP (49) of the invention. The building (23) and its air-conditioned space (21) is adjacent the heat-pump system (22) and its connected heat exchangers (evaporator and condenser, not detailed).
Figure 2:
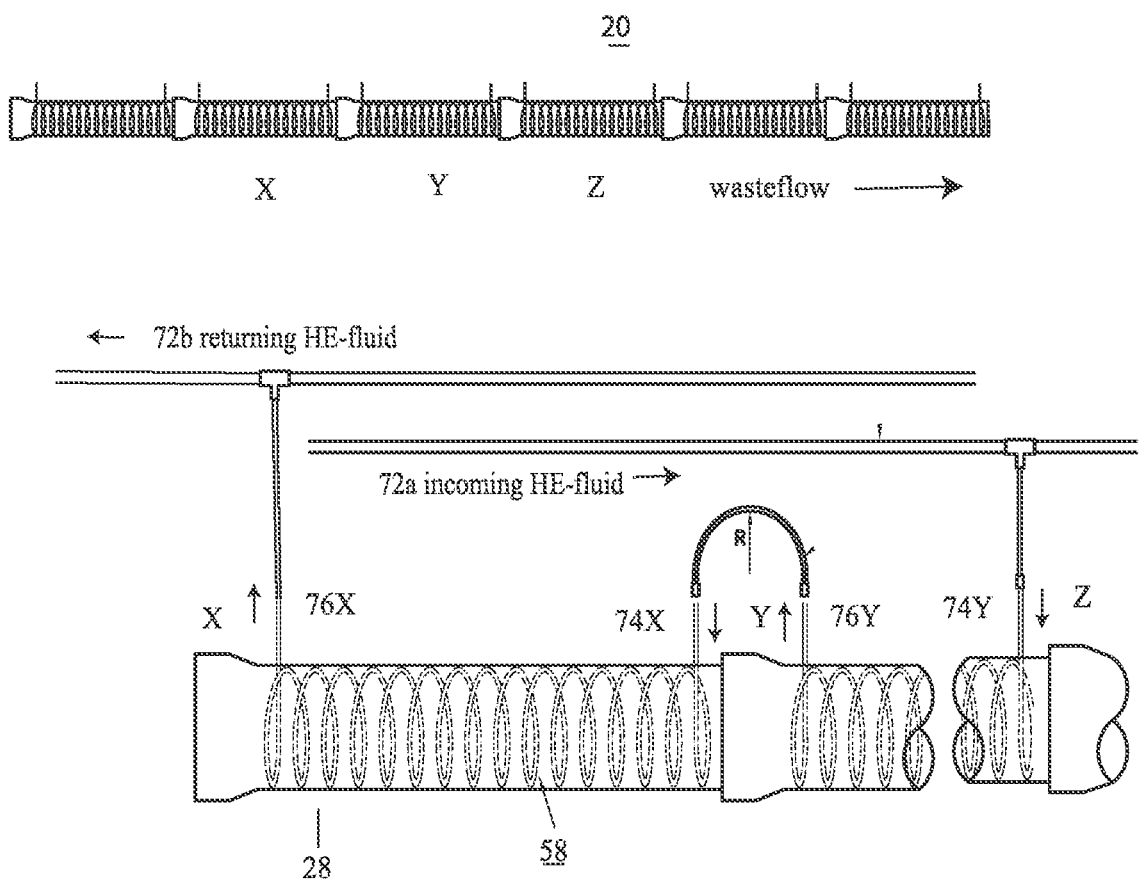
FIG. 2 upper is a schematic view of a buried array of cRCP sections each section (28) provided with a single HE-channel (58); for clarity in display of the connections possibilities in the upper drawing, the outflow and inflow tube extensions of the HE-channels are shown as perpendicular to the array-axis and facing vertical upwards (re local gravity gradient) as bedded. Wasteflow direction inside these cRCP sections is bell-to-spigot.
Figure 3:
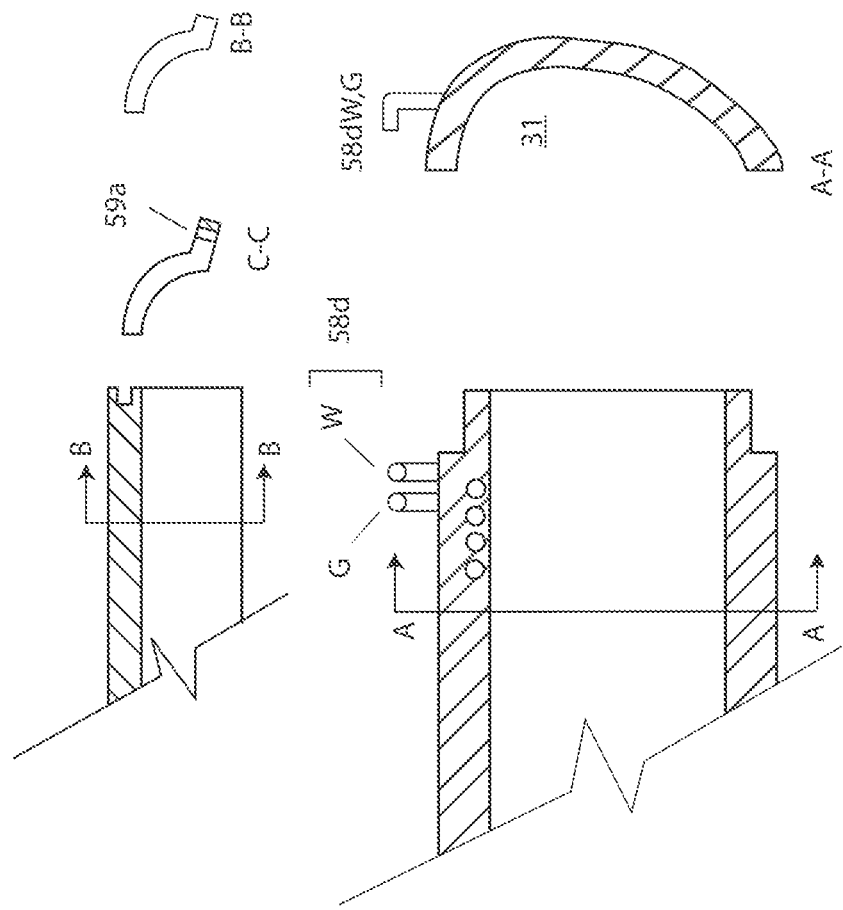
FIG. 3 (lower) shows longitudinal-section schematic views of a cRCP section provided with wall-encapsulated, helix-wound wasteside (W) and groundside (G) channels between its bell and spigot ends; the particular wall shape and wasteflow profile may be either cylindrical (30) or non-cylindrical (31). Each channel is provided with an external inlet and outlet extensions, (58d) and (58e) respectively, with the channel inlets at the spigot end. In this section view, the extensions are shown schematically and the laterally-outermost location of the wasteside HE-extensions is shown; the laterally-innermost location of the groundside extensions is also shown. Of course, each individual HE-fluid stream may be independently controlled in temperature, and flow rate as well as separately directed into either parallel or counterflow direction to the wasteflow under the control of the system (22). This view shows a schematic section of wasteside channel on the right view and a schematic section of the groundside channel on the left detail view; although only a few turns are shown, both channels extend almost the entire pipe length.
Figure 3:
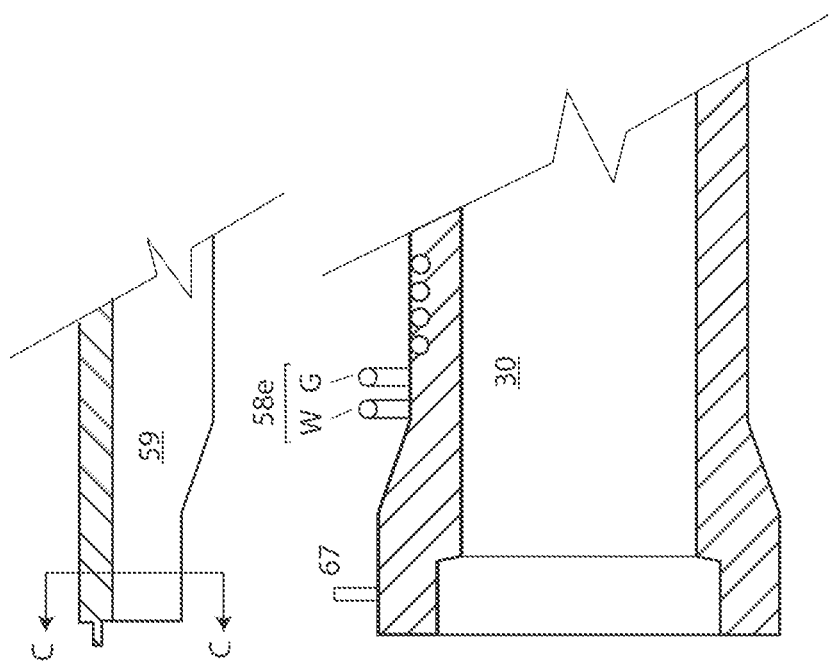

FIG. 3, transverse schematic sections B-B and C-C, illustrate the cover profile (59) adjacent its bell and spigot ends respectively; covers are sized and shaped to cover and protect function-tested extensions, channel connections and fluid manifolds during backfill and throughout the service life of the cRCP.

Figure 4:
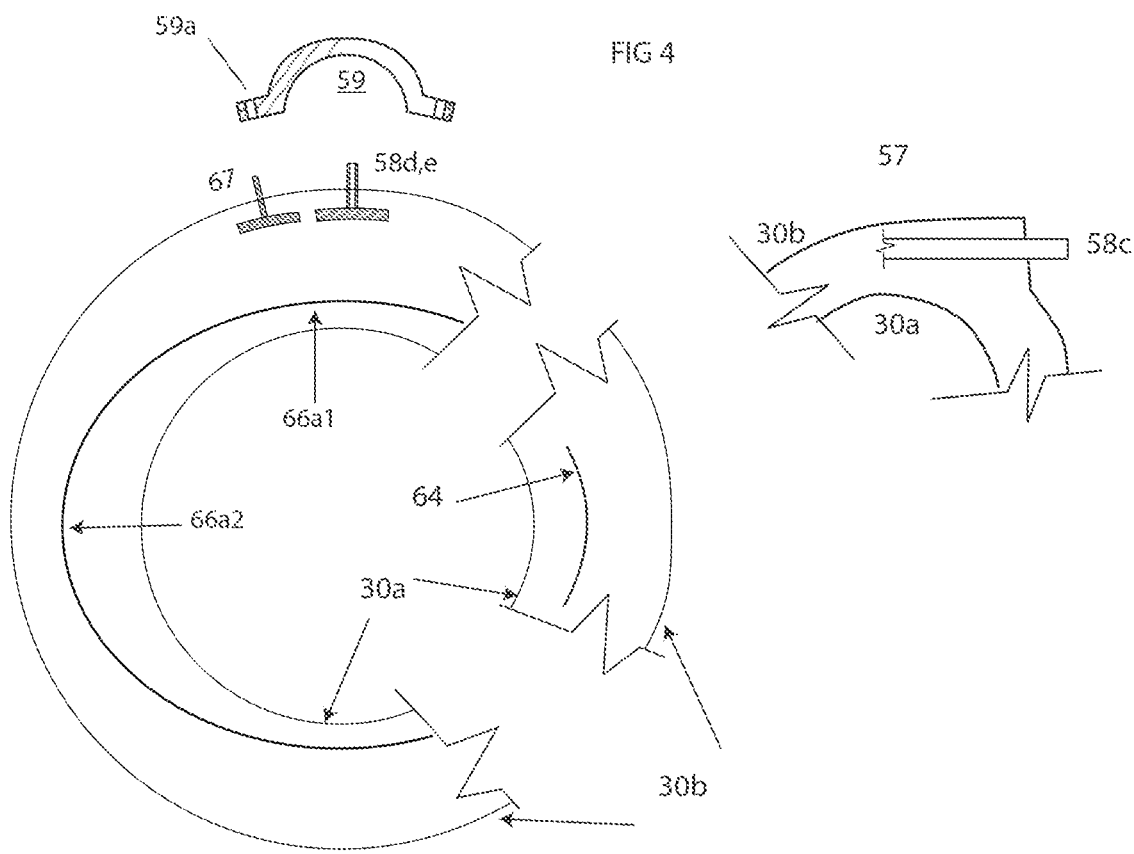
Figure 4:
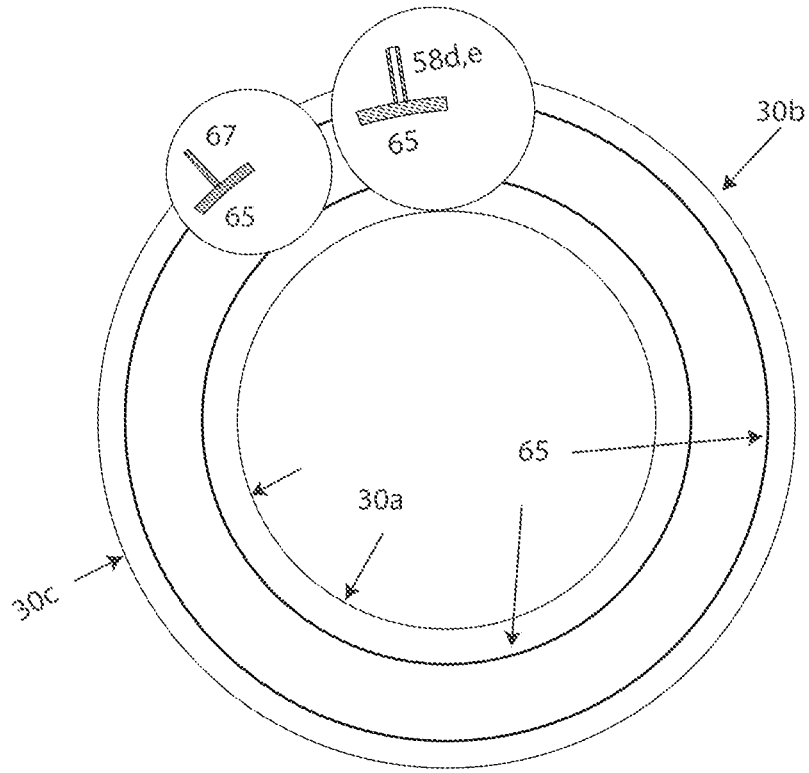

FIG. 4 upper_left shows a schematic transverse section diagram showing a cylinder cRCP with an elliptical C-steel reinforcement cage with axial-radii (66a1) and (66a2) along with upper-right, section of an alternative cylinder cage of a different C-steel radius (64a2); either cage supports a single HE-channel. Indicia (30a) and (30b), respectively, denote the radii of internal and external walls of the cylindrical pipes. For clarity in the upper view, the extensions for the single set of fluid-system connections are shown schematically as extending outward from the pipe top-exterior portion under the cover so that function-tested fluid connections may be protected prior to and during backfill. Extension (58d) and (58e) are shown schematically in this view for convenience; their typical axis-vector orientations are tangent to the last embedded tie point.

FIG. 4 upper_right shows a schematic transverse cRCP section by a plane cutting perpendicular to the pipe axis and along the CL of the HE-extension about 25-200 mm outside the terminal tie point. This detail illustrates the optional pipe-surface-sleeve-boss designed to prevent chipping off of thin concrete areas adjacent the emerging HE-channel; this feature protects the HDPE from both low-radius bends and possible damage from edges of fractured thin concrete.

FIG. 4 lower schematic shows a transverse cylinder cRCP pipe section with inner and outer reinforcement layers, (65-0) and (65-00) respectively, each capable of supporting at least one independent HE-channel; (30c) indicates the schematic cRCP wall thickness.

FIG. 4 also depicts optional axis-rotated angular displacement of selected exterior features, e.g., extension bosses (57), extensions (58) and anchor posts (67) on the external pipe surface in the detail insets. For convenience in placing the fluid manifolds and interconnections, the inlet and outlet bosses for each channel in a section may also be custom positioned. The positioning options include: (a) all four bosses aligned along the top of the section, (b) inlets for both channels offset to alignment on the same pipe-side with outlets aligned on the opposite pipe-side and (c) unique alignment to facilitate a short connection from the outlet of the inner channel to the inlet of the outer channel of the same section.

Figure 5:
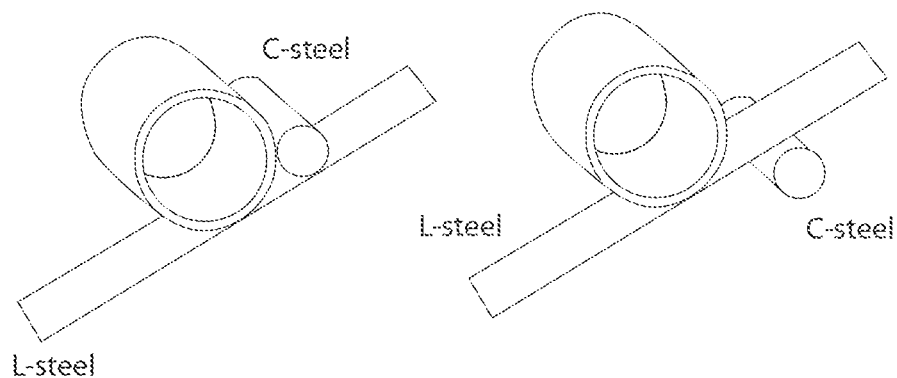

FIG. 5 shows two alternative oblique-transverse schematics of the intersections of: C-steel and L-steel reinforcing elements and the HE-channel for a particular layer. In the left configuration the channel and C-steel element are shown as being aligned essentially parallel and in physical contact lengthwise; this situation occurs for independent bar or wire reinforcements (welded at crossing points) and all three cage elements are tied together at predetermined intervals.

FIG. 5, right configuration, illustrates the channel being wrapped over the L-steel and not in full physical contact with the C-steel; this arrangement allows the helix-winding pitch of the channel to be independent of the spacing of the circumferential steels of the supporting welded-wire-mesh reinforcement. The channel is tied together with the nearest-adjacent L-steel element with cable ties at predetermined intervals/crossings.

FIG. 5, which is a schematic oblique sectional view, also illustrates the concept of bespoke welded mesh for every EPipe cage layer [custom-patterned-mesh-reinforcing for the concrete]. By cRCP-design, the particular gauges of multiple selected L-steel and C-steel wires, as well as their C, spacings in the mesh, can be chosen to provide cage-rigidity for accurate positioning of all elements during molding, sufficient tensile reinforcement as well as optimal thermal coupling with the channel helix. For such configurations, the channel and intersections of other elements can be tied together at predetermined 3D locations with robust ties [breaking strength about 225 N]. This design and manufacturing process also assures sufficient cover and consistent thermal coupling along with precise 3D location of external bosses and channel extensions. Further, for a specific cage-layer, the channel OD, its total length and effective contact area are thus variable within definite upper and lower limits for a specific pipe ID and length. The active HT area of a particular channel is adjusted by the number of helix turns; likewise, the placement of the active HT-portion of the channel may be customized along the pipe length.

Figure 6:
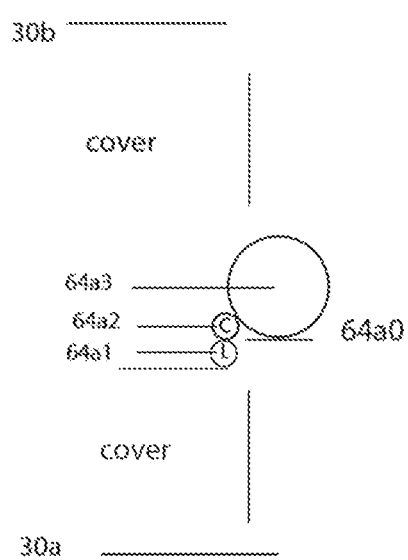

FIG. 6 shows a transverse-schematic section of a cRCP embodiment with a single HE-channel; the center position of each cage element re the pipe axis is defined in this view and TABLES 1 and 2.

Figure 7:
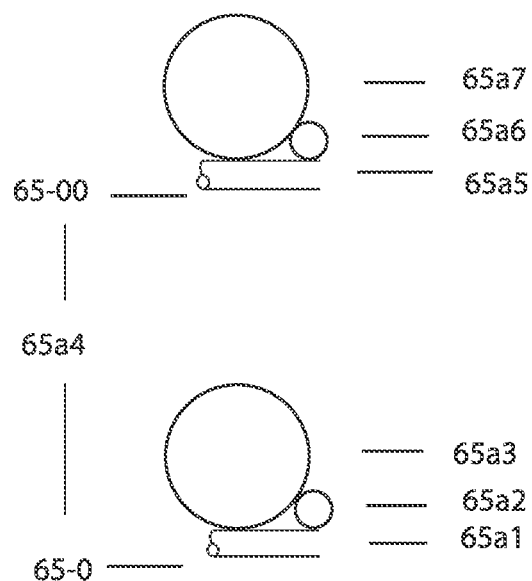
Figure 7:
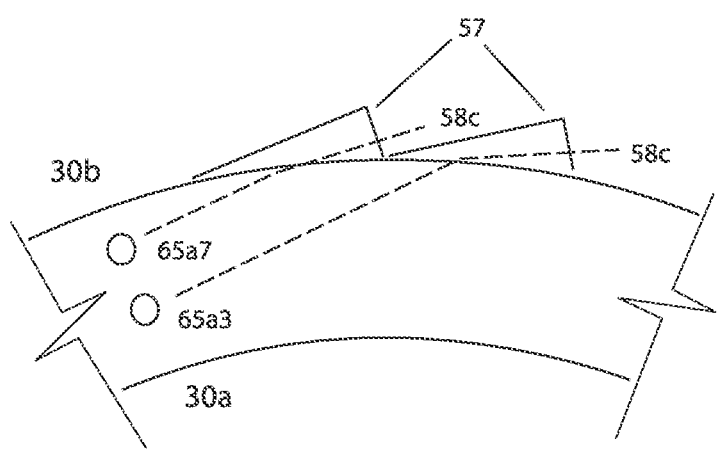

FIG. 7 upper shows a transverse-schematic section of a cRCP embodiment with two HE-channels; in this view the two C-steel and two HE-channel axes are overlaid radially and wrapped with the identical helix pitch along the middle portion of the section. FIG. 7 lower shows a schematic transverse-like view, at either bell or spigot end, of two channel-extension-axes extending from the terminal tie point, through the wall-integrated external bosses and thence outward for connection to the external fluid system. The longer extensions for the bottom layer may be passed either through the layer-2 cage or around its ends [if outer cage is shorter]. The form and position of each cage element is defined in this view and in TABLES 1 and 2.

Alternatively, the layer-2 cage may be positioned with its L-steel-array rotated CW up to about 45 deg. around the pipe axis; the resulting staggered reinforcement elements can thus be positioned in a transverse plane between similar elements in layer 1. This option would be considered during the cRCP design process for optimization of radial-thermal gradients across the pipe wall or more uniform section-area distribution for C-steel and HE-channels. These options are mentioned to illustrate the challenges of the cage-design process for cRCP. One must balance channel OD and active heat-transfer area against lines_zones of mechanical weakness within the wall and resulting narrow spaces through which aggregate materials, fibers and mortar must pass freely during pipe manufacture.

Figure 8:
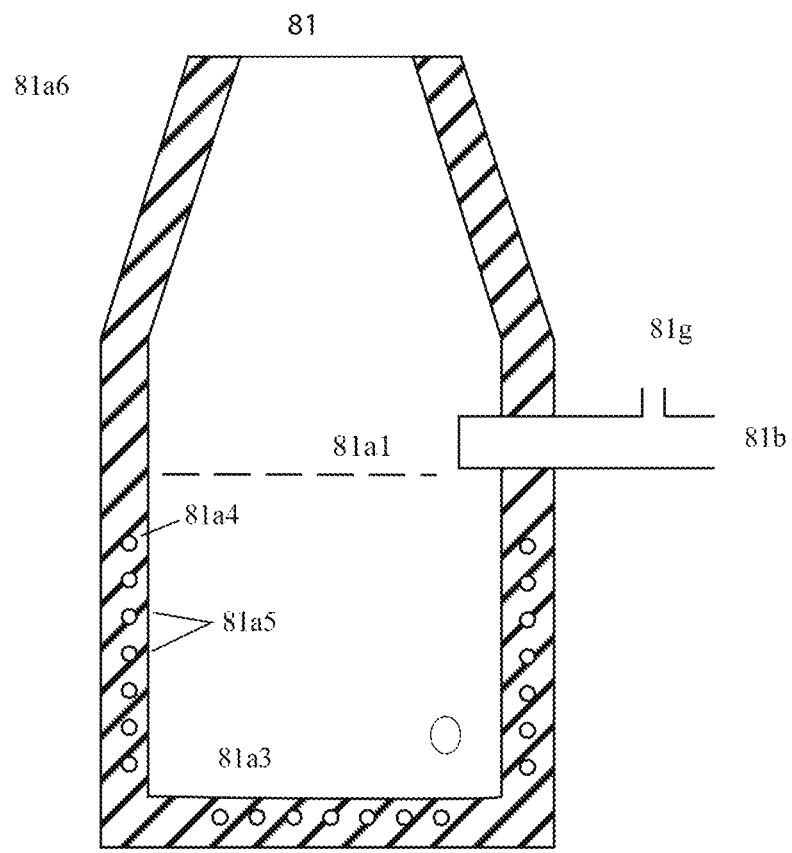
Figure 8:
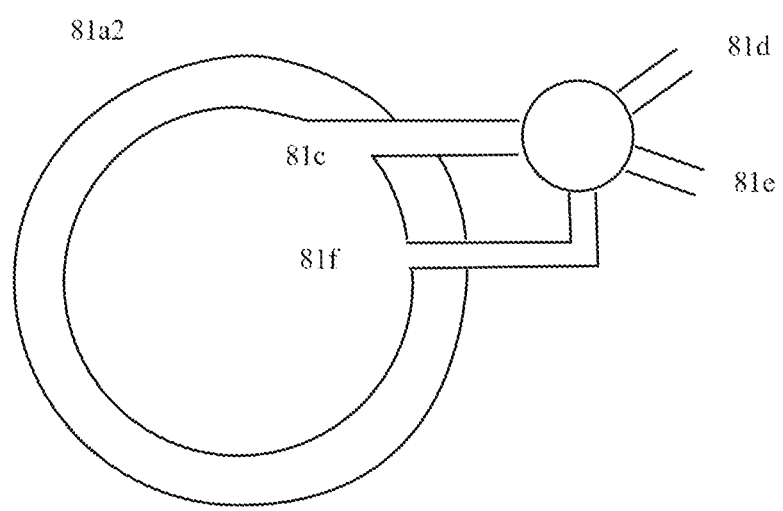

FIG. 8 shows a schematic vertical section of a manhole-type GW-accumulator provided with HE-channels connectable to a local cRCP array and adjacent to a local system (22) configured to exchange heat with the building HVAC equipment. The lower schematic shows the valved-pumped discharge arrangement with: (81d) into GW processing, (81e) into the local sewer along with BW, when GW processing is off (reservoir full, sub-freezing temperatures, other) and (81f) into a jet-agitation manifold to redisperse possible sediment on accumulator bottom. Known algorithms are available to control and optimize the HE-fluid circulation between the accumulator and other connected cRCP sections.

An alternative embodiment of the accumulator (81h) can be formed from one or more horizontal cylinder cRCP sections interconnected and configured to hold at least about 4 m$^3$; such configured sections may also be provided with selected cRCP elements and components listed in TABLE 2.

DETAILED DESCRIPTION OF THE INVENTION

Preferably, the heat exchange system (20) includes one or more elongate pipe bodies (28), each pipe body (28) defining a conduit (30a) therein in which one or more fluids (32) are receivable. Each pipe body (28) also includes an exterior surface (30b) which is adapted for thermal and mechanical engagement with ground material. The heat exchange system (20) preferably also includes one or more known ground loop circuits (38) in fluid communication with one or more pumps, for circulating a heat transfer medium through each ground loop circuit whereby heat is exchanged between: the conditioned air of the building, the waste stream and the soil into which the pipes are bedded.

The conduit in the pipe body preferably is for channeling waste water, i.e., the pipe body preferably is a concrete sewer pipe. The fluid in the conduit is waste water, which may include in fact various liquids and solids. For instance, the sewer pipe may be part of a sanitary sewer or a storm sewer system. As with relatively shallow ground material, the waste water typically is relatively warm in winter and relatively cool in summer (i.e., compared to ambient air), and the temperature differences are exploited in the invention. In summary, depending on (i) the temperatures of the ground material and the fluid in the conduit and (ii) the results intended to be achieved via controlling the indoor fluid's temperature, heat may be transferred to the heat exchange fluid in the heat exchanger from the heat exchange medium in the end portion (i.e., the ground material and the fluid may be used as heat sources), or alternatively, heat may be exchanged from the heat exchange fluid in the heat exchanger (24) to the heat exchange medium in the end portion (i.e., the ground material and the fluid may be used as heat sinks). It will be appreciated by those skilled in the art that the pipe body is not necessarily a sewer pipe, and the fluid in the conduit may be any suitable fluid (i.e., a fluid which is relatively warm in winter and relatively cool in summer).

For example, in winter, the ground material to which the pipe portion (46) is proximal may be relatively warm, as is the fluid in the conduit. Also, the indoor fluid (e.g., air) typically is required to be warmed from time to time by conventional heating means, supplemented by the heat pump. In this situation, heat is transferred to the heat transfer medium in the pipe portion (i.e., circulated through the loop circuit, including the pipe portion): (a) from the fluid in the conduit; and (b) from the ground material. However, when the warmed heat transfer medium is circulated through the end portion, such heat transfer medium is brought into proximity to the heat transfer fluid, which is circulating through the heat exchanger in the heat pump. In this situation, heat is transferred from the (relatively warmer) heat transfer medium in the end portion to the (relatively cooler) heat transfer fluid in the heat-exchanger, thereby lowering (or eliminating, as the case may be) the extent to which other energy inputs to the conventional HVAC unit are required in order to achieve the desired increase in the indoor space's temperature.

When the indoor fluid (21) is to be cooled (e.g., in summer), the situation is reversed. Heat is transferred from the (relatively warmer) heat transfer fluid in the heat exchanger to the (relatively cooler) heat transfer medium as it is circulated through the end portion of the ground loop circuit. In this situation, heat is transferred from the heat transfer medium: (a) to the ground material, which is cooler than the heat transfer medium; and (b) to the fluid in the conduit, which is also cooler than the heat transfer medium.

The connecting portion includes one or more HEMs (supply) and HEMr (return) manifolds (38) for delivering and receiving the heat exchange medium to-and-from each group of the pipe portions respectively and thus to achieve heat exchange Prescribed Reinforcing Cages in Std. RCP. Because concrete is weak in tension, typical buried Reinforced Concrete Pipe (RCP) installed for community gravity-flow waste transfer is formed as a cylinder with at least one reinforcement cage embedded into the walls. Typically, low-carbon steel having a tensile yield strength of 420 to 520 MPa is used for the required cage members for standard RCP. For certain pipe-like fluid-handling applications, non-circular, arch or elliptical cross-sections may be employed; for these situations the cage(s) may be custom fabricated from a defined mesh (woven or welded) or individual orthogonal rebar arrays. Typically, circumferential reinforcing members for RCP are std. rebars not more than 100 mm apart and this arrangement of steel limits growth of cracks in the concrete due to extreme external loads applied radially such as the (Three-Edge Bearing Test). Cracks may develop in tension zones of pipe interior (obvert and invert regions) or exterior surfaces (springline) due to stresses of handling, installation, backfilling and in-service situations. In many cases the required circumferential reinforcement is a single rebar which is helix wound over an array of longitudinal bars held in a jig; upon completion they are joined together by known means into a robust 3D cage which is precisely located within the pipe mold.

Failure Modes of Std. RCP with Double and Triple Cages. Cylinder RCP of ID larger than about 400 mm may be prepared with at least three reinforcement cages, the individual elements and interconnections each being defined by local regulations. Typically, dual and triple cages are shaped from orthogonal bars or formed sheets of wire mesh (w. overlapping joint portion) and configured into the required structure by commercial spacers, connectors or stirrups. Pipe-design algorithms compliant with certain ASTM or ISO standards for reinforcement bars are now incorporated into commercial programs now used for standard cylinder-form pipe to be laid as gravity sewers. Regrettably, for a conventional RCP sewer with intermittently-wetted internal or external cracks, aggressive concrete deterioration may go undetected for years. Typical structural failure modes of normal waste pipe include delamination arising from rebar corrosion, cracking caused by alkali silica reaction (ASR), and cracking caused by overloading/excessive vibration. Common sewer-cage failure modes include bond loss, water reactions and anomalous compaction of trenching components.

Documented Std. Wasteflow Pipes & Systems, "dRCP". Depending upon expected wasteflows and external service loads which may be applied at grade upon the below-ground pipe, reinforcing cages, each composed of steel elements, the latter being specifically-placed circumferential and longitudinal members, are required by law. Std. sewer pipe ID is sized using classic formulas which connect population and neighborhood type with daily sewage generated and its hourly volume profiles. Individual std-documented-gravity-sewer-pipe sections, "dRCP", are usually 2-3 meters long, may be designed and tested according to local and international standards and have particular reinforcement(s) integrated within their walls during the manufacture of each length whereby defined loads transmitted through backfill are supported. Because "dRCP" do .NOT. include embedded HE-channels, classic "indirect design" methods and handbook guidelines are widely accepted for configuring standard reinforcement cage elements required for pipe handling and expected service stresses.

Building, Neighborhood or District Heat Exchange with Wasteflows. Climate change has been discovered by several advanced States during recent years; this has resulted in political measures to minimize energy waste and $CO_2$ production as well as funding research on schemes to recover energy for local space heating in winter. Cost-effective plans to recover heat from wasteflows is best accomplished by starting at the earliest planning stage for a new development; retrofitting existing old-art sewers is extremely costly and economic benefits of district heat recovery might not be realized for many years.

Because every new subdivision has a unique topology and other technical challenges to which reliable future public sewerage systems must be optimized, cost-effective design of customized "cRCP" sections (or sewer assemblies) of variable size and configuration for a new subdivision involves state-of-the-art computer models. A privately-owned drain lateral from a building or the common sewer from a group of buildings may be placed in a custom trench and assembled from one or more custom-pipe-sections, or "cRCP", lengths, said sections also provided with a wall-embedded, interconnected fluid-circulation path and customized heat pump to transfer recovered energy into operational systems of adjacent building(s).

Special Batch Concrete [SB] Materials & Processing for cRCP Sections. SB concrete for EPipe (48) contains at least 14 wt. % fine-disperse limestone particles, about 10-30 μm in diameter, which serve as crystal-nuclei for accelerated development of calcium-silicate phases during hydration. Limestone powder ($CaCO_3$, frequently with small amounts of Mg—as minerals calcite and aragonite) in SB is a useful filler and it imparts early strength according to the size/shape of particles and their addition level, typically 5<wt. %<18. Fine calcite particles may also be favorable in accelerating the hydration process. In concrete with fiber additives, $CaCO_3$ whisker crystals (orthorhombic phase $CaCO_3$, about 10 μm diam up to 200 μm long) formed within the mortar during hydration also have a synergistic effect re limiting micro-crack propagation.

Early green strength of SB concrete during the first 50 hours after casting is developed due to progressive rigidification of the mortar due to particle agglomeration and nucleation of calcium-silicate-hydrate (C-S-H), calcium aluminate and calcium sulfoaluminate within interstices. Such early hydration reactions of the cementitious components results in an increase of the shear resistance which begins during vibration stages of pipe production.

Dry-mix SB concrete (48) includes a defined weight fraction of Portland clinker with a Blaine specific surface area of about 5000 to 8500 $cm^2/g$ according to the SB batch specification which includes the following components:

Portland clinker having a Blaine specific surface area (BSS) comprised from about 4500 to 9500 $cm^2/g$;
additive materials having a measured particle diameter less than about 150 μm selected from limestone powders, calcined shale, metakaolins, siliceous fillers, silica powders, pozzolans, slags, fly ash and mixtures thereof; fly ash;
at least one alkali sulphate;
at least one source of $SO_3$;
the sum of (quantity of additive material)+(quantity of fly ash)+(quantity of clinker)+(quantity of alkali sulphate)+(quantity of a source of $SO_3$) is about 220 $kg/m^3$ of concrete;
1500 to 2200 $kg/m^3$ of aggregates;
a plasticizer;
optionally an accelerator and/or an air-entraining agent and/or a thickening agent and/or a retarder and/or a clay-inerting agent;
with about 140 to 220 $l/m^3$ of effective water, the total quantity of clinker in the wet concrete being about 200 $kg/m^3$.

The cement-like materials used for preparing SB concrete being defined as:

Portland blast-furnace slag cement: An intimate and uniform blend of portland cement and fine granulated blast-furnace slag in which the amount of the slag constituent is within specified limits.

Slag cement (Ground, granulated blast furnace slag): A hydraulic cement formed when granulated blast-furnace slag is ground to a suitable fineness.

Granulated blast-furnace slag: The glassy, granular material formed when molten blast-furnace slag is rapidly chilled as by immersion in water. Also referred to as granules.

Blast-furnace slag: The non-metallic product, consisting essentially of silicates and aluminosilicates of calcium and other bases, which is developed in a molten condition simultaneously with iron in a blast-furnace.

Pozzolan: A siliceous or siliceous and aluminous material, which in itself possesses little or no cementitious value but will, in finely divided form and in the presence of moisture, chemically react with calcium hydroxide at ordinary temperatures to form compounds possessing cementitious properties.

Granulation: The rapid quenching with water of the molten slag into a raw material called granules; rapid cooling prohibits the formation of crystals and forms glassy, non-metallic, silicates and aluminosilicates of calcium. These granules are dried and then ground to a suitable fineness, the result of which is slag cement. The granules can also be incorporated as an ingredient in the manufacture of blended portland cement.

SB Aggregates include: 12.7 mm Coarse (Nom.Max size: 20 mm), River Sand & Fine Aggregate (2.91 fineness modulus)

SB Concrete As-Needed Additives include:
about 180<WRDA water reducer, ml/100 kg cement <400;
about 130<DARATARD 17 Retarder, ml/100 kg cement <520; and
about 100<ADVA Superplasticizer, ml/100 kg cement <460.

SB Concrete Polymer-Fiber Additives include:
about 1.8<TUF Strand SF Fibers (EuclidChem), $kg/m^3$ concrete <12.0.

SB Pipe-Casting Process includes a cRCP EPipe casting machine with integrated and controlled-intensity vibration system.

SB Molds for S&DEPipe are a special type which provide for forming particular sizes/orientations of pipe-external-surface bosses for end-connections of HE-channels.

Fiber Reinforcement of SB Concrete. In order to prevent spreading of microcracks which may develop during service life of pipe and the resulting corrosion and spalling, the advanced concrete for cRCP may also contain uniformly dispersed reinforcement filaments of metal, glasses, polymers and carbon (47). The maximum reinforcement effect of dispersed fibers is obtained by configuring the axes along the tensile stress gradient within the pipe wall; special molding procedures may be required to get preferred circumferential positioning of specific fiber types and amounts. The surface bond between the filaments and the hydrated concrete is important for controlling nucleation and growth of cracks. Certain monofilament types offer rippled or corrugated surface which is specific-dimension-scaled for wetting and ingrowth of hydrates during the particular hydration process under controlled section-orientation, time, temperature and humidity.

SB concrete for cRCP includes fibers varying in length from 20 to 80 mm and aspect ratio about 50-90; these are added at prescribed times and in specific amounts, from about 0.1 to 12 kg/m$^3$, during manufacture to achieve additional control of crack growth of the resulting cRCP. Fibers such as polypropylene or blends with up to 25 w/o polyethylene exhibit tensile strength in the range 600-650 MPa (Length about 40-60 mm, Aspect Ratio about 70-80, Modulus of Elasticity about 9.5 GPa).

cRCP-EPipe Concrete Molding Parameters (48a). All wall-embedded HDPE tubes are fluid-filled and sufficiently pressurized to assure that no portion of any channel is flattened or kinked during the process of filling the mold; it is especially important to monitor the aggregate(s) being used since oversize grains may deform the tube or block complete filling of concrete throughout the cage even under vibration. Thus, control of SB-slump can be important for cRCP.

EPipe molding is dry cast or zero-slump along with a vibration amplitude of about 1.5<G, gravity-accel. <3.

The mix is prepared with treated water and homogenized at a temperature in the range 18-25 C The casting process is accomplished in about 5-50 minutes under visual inspection.

All HDPE tube(s) are pressurized to about 900-1300 kPa during molding.

The EPipe mold is sufficiently vibrated mechanically along 1-3 orthogonal directions during filling with concrete to assure complete filling of mix into all recesses of the cage and elimination of air pockets. Because concrete can exhibit both rheotropic and thixotropic characteristics related to the rate of structure development, these factors must be anticipated—and possibly exploited during molding.

EPipe Hydration Parameters (48b). About 2-8 hours after molding the EPipe section is extracted from the mold and placed vertically (standing on bell-end) into a environmental chamber and where it is exposed to controlled conditions of air circulation:

Duration—about 600-700 hours;
Air temperature—about 20-50° C.;
Air humidity—about 50-100 RH.
At the end of this procedure each section is subject to inspections and testing of batch specimens and release into inventory.

Typical physical properties of hydrated concrete of EPipe:
heat capacity, $0.9<c_p$, kJ/kg-K<1.2
density, $2200<\rho$, kg/m$^3$<2400
thermal conductivity, 0.9<k, W/m-K<2.0
thermal diffusivity, $0.6<\alpha$, mm$^2$/s<1.0

Customized Cages and 3D Steel Reinforcement Bars/ Mesh in cRCP Sections. High-strength steel reinforcing elements suitable for cRCP sections is available in a number of strength grades (40-100, e.g, about 420<TYS, MPa<520) in multiple sizes (3<nom. Diameter, mm<16). The terms L-steel and C-steel designate longitudinal or circumferential elements, respectively and the elements are 3D-configured under bending-pin limits and mechanically connected at contact points of individual bars or wires of a mesh. Particular element diameter and 3D configuration in the cage is initially evaluated by computer modeling and finally confirmed by stepped-stress tests, e.g., ABAQUS analysis of patterns of moment and stress along with Three-Edge Bearing Test on full-size prototype specimens. To assure its 3D positioning for optimal heat transfer, every HE-channel is sufficiently fastened to the reinforcing elements at regular intervals using known, long-term tie-fixtures appropriate for the specific HDPE size and wall thickness. If the pipe application may involve handling wastes with corrosive agents, known surface treatments and/or coatings may be applied to specific steel components or selected portions thereof to be used for cRCP. When steel welded-wire mesh sheets are used for a specific cage layer, a specific mesh overlap zone of defined width, e.g., 0.1<overlap width, nom.pipe ID<1.0, is mechanically connected and this zone may be positioned_centered at a particular angle re the "TOP Orientation" of the final-installed pipe section. For helical C-steel bar splices, the overlap distance is about 50 bar diameters; particular configurations of bar-splices in a pipe cage and placement rules for mesh quadrant mats are prescribed in detail by relevant codes.

Additional Features of cRCP Cages. The cRCP of this invention can be ID-scaled over a range of about 300-2400 mm and produced in pipe sections weighing up to about 10 000 kg intended for sewage applications. Known lifting fixtures may be added at particular "TOP Orientation" locations on pipe ID above about 1 m; a "Top Orientation" marker is placed on all sections adjacent bosses; care is exercised during trench placement to locate these cRCP markings uppermost.

Service-Stress Patterns in cRCP and Inspection Technics. Today it is possible to use digital methods, including ABAQUS, to model stress patterns around HE-channels in cRCP pipe using Linear Elastic Fracture Mechanics (LEFM); this has allowed design optimization via modeling of the tensile stress concentrations and the crack-growth (or coalescence) rates in such zones. For certain wasteflows with chlorine content higher than 500 parts per million, careful design of both concrete and cages is needed to diminish the risk of premature collapse of cRCP due to corrosion resulting from wetted 0.5 mm cracks which may intersect circumferential steel reinforcements.

Because embedded HE-channels to not contribute to pipe mechanical properties, cRCP sanitary-drain sections must be structurally robust and especially designed to facilitate early detection of potential problems due to cracks and avoidance of sudden catastrophic failure of the pipe and heat exchange system.

It is anticipated that all in-trench cRCP sections (laterals or mains) will be inspected by visual probes immediately upon completion of backfilling and that regular surveys at proximate manhole locations in the flow direction will be used to detect surface deposits, anomalous pH or likely corrosive anions in the BW streams.

Wall-Embedded HE-Channels (HEC), cRCP (58). In general, the ratio of wall thickness to ID for cRCP is in the range 0.16 to 0.10 (300-2400 mm ID, respectively). Along with the number, size and 3D-placement of reinforcement cages, wall thickness also defines the upper limit of embedded heat-transfer surface, i.e., the count and external area of HE-channels, which can be incorporated into a typical cRCP section. Sufficient concrete cover for either a HE-channel or cage elements of unique-design cRCP is about 25-50 mm.

Typical HDPE tubing (58): 18<OD, mm<32; 1.5<wall thickness, mm<4; Typical pressure Rating: 5<long-term service pressure, Bar @20° C.<15

Embedded HDPE typical tubing (HEC) physical props.:
density: $900<\rho$, kg/m$^3$<950
thermal conductivity: 0.33<k, W/m-K<0.53
thermal conductivity of UHMWPE crystal at about 300K: k~104 W/m-K
thermal diffusivity: $0.2\times10\text{-}6<\alpha$, m$^2$/s<1.1×10-6
heat capacity: $1350<c_p$, J/kg-K<2000
Ultimate Tensile Strength @ about 300K: 17<UTS, MPa<26
Min. bend radius ~20*OD The outside diameter of the HE-channel for one embodiment of the present invention is about 19 mm for cRCP internal diameter of about 300 mm. If such a channel is wrapped as a 76-mm-pitch helix over a single, cylinder-type cage, the available heat transfer area of the channel is about 0.7 m² per meter of active pipe length. The hourly energy exchange with wasteflow for a 2.4 m single-HEchannel section of cRCP depends upon its velocity, the internal wetted area and the ΔT between it and the circulating HE-fluid, such as water-glycol solution (500<$N_{Re}$, Reynolds No. <5000), flowing inside the channel with an overall heat-transfer coefficient, U, of about 0.3 kJ/sec-m²-K.

The present invention anticipates possible addition of multiple, independent channels for either wasteside or groundside heat exchange into each cRCP section. It is expected that some applications may require EPipe with two independent groundside channels along with a single wasteside channel. Such multi-channel custom exchange-area configurations would involve setting each specific length of channel helix to a specific pitch value and being able to secure it to a particular surface portion of the specific cage to which it is being attached. For a double-cage embodiment of cRCP, the present invention anticipates fastening of each helix-wound fluid channel at regular intervals e.g., at each turn or about every 300 mm of pipe length, to at least one of: (a) the waste-side of the inner cage and (b) the ground-side of the outer cage.

For maximum heat exchange efficiency, the perpendicular distance from each channel ₵ axis to the nearest pipe ID or OD surface is important; this average distance across (special-batch or fiber-reinforced concrete) of the pipe wall section should be in the range 30<heat-path-length, mm<50. Each channel should be accurately 3D positioned re the adjacent cage and sufficiently fixed thereto by wires or known special clips to prevent any movement or deformation during pipe manufacture. Precise positioning of reinforcements and resulting minimum spacings between members and channels must be done in consideration of the maximum aggregate size in the required concrete blend and the manufacturing process for the pipe ID. Radial spacer elements (45) are also used to assure 3D positioning of steel reinforcements, i.e., separation of layers of L-steels; if radial separation is too small, the movement of mortar and aggregates may be hindered during mold filling.

At daily startup of a cRCP wasteline under winter operation and possibly during subsequent periods of low wasteside flow, the pipe-ID surface may reach the dewpoint of the humid air inside the pipe (for waste at 15° C., about 3° C.); while condensation will provide energy transfer, operational algorithms should control HE-fluid parameters to avoid excessive cooling of the unwetted cRCP pipe surface for economic reasons and for avoidance of excessive thermal gradients in the concrete.

Differential Thermal Expansion of Phases and Resulting Stress Patterns in cRCP. In winter, circulation of HE-fluid at temps below about 280 K in the HE-channel of buried cRCP carrying a typical wasteflow may cause tensile stress in the adjacent mortar phase due to typical lower TE-coeff. of aggregate along with the resulting temperature gradient. For this situation the HDPE tube will also be stressed in tension because its thermal-expansion coeff. is about 10× that of either steel bars or mortar; this may induce separation blisters at the mortar interface and reduce heat transfer. Thus, in the design of cages and placement of HE-channels in cRCP, maximum resulting temp. gradients across the mortar and aggregate must be considered, especially for summer operations when heat is being rejected into wastestreams. For reliable cRCP operation, temperatures of HE-fluid and wastestream are regularly monitored by known sensors; the active sensor inputs are used by the known control system to avoid ΔT exceeding about 5K between the HT-fluid and the wasteflow in any pipe section or group of connected sections.

Special Handling and Entrenchment Protocols for "Ultra cRCP". In some situations, for example extreme surface loads or local seismic activity (natural or induced), special ultra-customized cRCP and protective entrenchment protocols may also be required. Even SB concrete has a low thermal conductivity, is brittle in tension (linear elastic modulus) and exhibits a low UTS (ultimate tensile strength); thus, thermally-efficient cRCP buried lateral or district-sewer sections for heat exchange must be carefully designed with particular reinforcement placement to resist handling and installation stresses as well as service loads which may be applied from grade.

Economics of GrayWater (GW) Recovery and Heat Exchange Coordinated with cRCP. GW recycling is not happening yet in middle-latitude States with strong economies; at present it is economically feasible in dry climate zones when potable public water becomes very expensive. In such situations it is expected that integral GW collection and reuse facilities will happen first for new residential buildings (150-200 persons); advanced-design waste systems for GW collection in dorms, apartments and hospitals will be the beginning. In US, retrofit of required plumbing for GW recycling is a major expense even for single-story family homes with a crawl space; for existing apartment structures, the costs of special piping to use GW immediately for landscape applications may not be recovered in less than 10 years. In advanced States the GWflows from bathing, showering and laundry is estimated as: USA about 75-170 de/person-day and for EU States about 60-100 de³/person-day at an average temperature of about 30° C. In a few EU locations heat energy recovered by heat exchangers from GW flows is used for preparation of domestic hot water; although such arrangements cost about USD 2500, they often produce reductions in energy usage in less than 10 years.

Economics of Energy Exchange with BlackWater (BW) Flows in cRCP. At present heat recovery technology from sewage is beginning to be examined in a few states in US. In many countries daily BW sewage flows from a residential subdivision are at temperatures of about 15° C.; the daily volume is estimated as about 0.15<m³/person-day <0.2 generated over a period of about 18 hours. In advanced States, this sanitary sewage includes fecal solids and toilet tissue; buildings and residences may also be required to have a pumping system which comminutes solids to a sub-mm slurry which is fed from the lateral into a gravity or low-pressure system for the subdivision or community. The heat capacity of this stream is about 1.2 Wh/kg-° C. and its temperature may frequently range from 5-25° C.; flows may drop to zero from midnight to sunrise and the design wastestream velocity ranges from about 0.6 to 5 m/sec. For locations remote from the equator, waste laterals and sewer mains are located below the local frost line. Typically the soil temperature increases about 0.03° C. per meter of depth and, below the frostline depth, may be about 13° C. Energy exchange between a building HVAC system and gravity-flow BW in a cRCP sewer is further complicated by a number of factors, especially gradual fouling by sediment during periods of very low flows. Such fouling must be anticipated by choice of special cRCP shape and special sizing to assure sufficient flow velocity to avoid sediment buildup along with placement of manholes suitable for periodic cleaning treatments over the cRCP sections.

Four-season Sewer & Geothermal Heat Exchange Using cRCP. Embodiments of the present heat-exchange system provide especially-configured cRCP suited either for geothermal heat recovery or heat rejection used as sewer laterals and/or mains. Further, a known vertical or horizontal geothermal system can be interconnected with cRCP of the present invention for additional economies. For many installations the groundside HE-channels will be interconnected to operate independently from the wasteside HE-channels; this allows heat collection when GW and BW flows are minimal. Automated control of heat-exchange parameters in the cRCP assembly is cost effective for all seasons for many locations by using known technology, i.e., wireless or wired networks, microprocessors and logic algorithms along with commercial heat pump systems; such fluid-circulation systems may be configured for rational, independent groundside or wasteside heat exchange across both heating and cooling seasons. Using known technology, i.e., wireless or wired networks, microprocessors and economic-logic management algorithms along with commercial heat pump systems, automated control of heat-exchange parameters in the cRCP assembly is cost effective over all seasons for many locations.

EXAMPLE 1—This illustrative example discloses the single-cage configuration for HE (thermal-exchange) cRCP pipe sections to be assembled into a typical application such as a lateral into the community sewer. One or more 300-mm ID cRCP pipe sections, each having a wall-embedded, helix-wound HE-channel and each about 2.4 m long, are connected end-to-end into an array; the array is used as a waste lateral or a sewer link between a building or neighborhood and an existing community sewer.

The sections are cast of reinforced, special-blended SB-concrete and the walls provide thermal exchange with both the wasteflow and the adjacent soil and groundwater. The HE-channel of each such pipe section is secured at regular intervals along its length to steel reinforcement components (L-steel or C-steel) and each channel is further configured with inlet and outlet tubular extensions, each extending outside the pipe exterior surface.

These extensions are further configured to emerge adjacent the bell and spigot ends respectively of the section. Section-external extensions of both terminal portions of said encapsulated channel are configured during casting to extend outward from the external surface of said section a distance of at least 300 mm from the adjacent encapsulated tie point. The axis of said extensions is configured: (a) into a plane perpendicular to the section axis, (b) tangent to the helix axis of the adjacent encapsulated portion and (c) held shaped to a curvature radius of at least 500 mm prior to final pipe placement. Upon fluid connection the extensions may be curved at a radius of curvature of at least 27 times the OD.

The tip of each extension (58c) may also be provided with a known termination connector or elbow fitting and protected with known robust, tamper-evident caps. The final channel connections between sections and their integration into the supply and return manifolds for the external HE-fluid circuits should be completed as soon as the array of pipe sections is aligned in the bedding. In this way the combined operation of external hydraulic and in-trench electronic components of the system managing the HE-fluid temperature and flow rate can be thoroughly tested. Thereby the heat pump controls, including all valves and sensors, can be tested for reliability and accuracy, i.e., maintaining particular flows and supply temperature values.

HE-fluid Connections Protection. Optional manifold-cover devices (59) having matching sockets (59a) for anchor posts are provided for selected section sizes and types; optional robust anchor posts extend from the pipe exterior are attached to the reinforcement cage within the wall These covers provide mechanical protection for the tested fluid interconnections and sensors prior to and during trench-backfill operations.

Optional GW Accumulator and HE Connections into cRCP Array. An optional GW accumulator provided with an at least one in-wall HE-channel and related temperature sensors is disclosed to facilitate water conservation in addition to heat exchange. This vessel is essentially a cRCP section with a closed bottom, its axis oriented vertical and emplaced alongside one or more cRCP sections arranged for horizontal gravity flow. After bedding is complete, the heat-exchange channels are interconnected into the external heat pump circuit and the flow is controlled in coordination with other circuit flows through cRCP sections connected into in the array. During four-season operation, the known HE-management system senses the instant accumulator status, i.e., GW volume and temperature, along with the temperature and flow rate of incoming GW and, after comparative analysis with recent daily profiles, activates the most-efficient flow pattern for the HE-fluid. This management system also controls accumulator pump-jet circulation (for sediment discharge), emptying and final GW disposition operations.

Reinforcement Components of the Cage. The low-carbon steel bar or wire used for cRCP cages is available in several standard grades, ranging in strength from about 400 to 700 MPa. The cage-components may each be formed to a particular 3D configuration from individual steel bars and/or wire-mesh sheets and finally unified by means of special fasteners or welding at points of contact (esp. mesh). Bending a bar to form a 300 mm circumferential helix around the bundle of longitudinal bars does not compromise its strength as a cage reinforcement; likewise, forming a flat sheet of mesh with orthogonal wires into a cylinder with a specific bonded-overlaid segment aligned to a particular orientation around the pipe-axis also offers effective reinforcement. Upon assembly, the assembled cage is securely positioned within the mold so that a minimum 25 mm-cover-layer of concrete over all internal components is assured for the finished pipe.

Since the HE-channels attached to a cage do not add strength to the pipe section, particular shape, size and placement of each individual cage component and the related channel must be practiced from the initial design stages of cRCP sections. The major design challenge is the sizing, spacing and welding of the circumferential C-steel elements and L-steel elements at their crossing points—which must be guided by FEA modeling of stress patterns generated by in-service loads, by step-stress testing of prototypes and simulations of tensile crack growth in acceptance tests of concrete sections.

Physical parameters of the preferred cage for 300-mm ID cRCP, a SingleEPipe, are disclosed by specific data in TABLES 1. and 2., i.e., beginning with the numbers 30 and 64. These data on each component indicate its particular positioning re the pipe axis and its critical dimensions; additional data such as known material properties is provided in the related text above. This embodiment is shown schematically in FIGS. 3, 4, 6 and 8. The design of this cRCP cage can be scaled up for pipe IDs in the range 300-1000 mm and provided with a single HDPE channel about 18-30 mm in diameter.

EXAMPLE 2—This example is an illustrative, purpose-interconnected HE-array of multiple 1044-mm ID cRCP pipe sections, each DoubleEPipe is provided with inner and outer HE-channels along with a known supporting HE-fluid management network, together being used as an advanced portion of an advanced community sewer able to accomplish heat exchange with both the wastestream and adjacent surroundings. This array of cRCP sections, however, is also capable of cost-effective thermal exchange with the nearby soil and groundwater below grade. Ideally such an array and its known external heat-pump network is customized for a new development having a known, local immediate application for thermal-energy exchange. However, such an array may be cost effective as retrofitted into certain existing neighborhoods where the thermal exchange can be provided into an existing nearby public institution to achieve operational economies of its HVAC systems. District thermal exchange can be justified by a cRCP upgrade adjacent a government building also fitted with especially adapted HVAC systems and a heat pump for energy exchange with the circulating fluid provided to the array. Further, if new construction also provides for local accumulation, treatment and reuse of GW discharges, additional energy is exchanged by means of interconnection of active HE-channels embedded into the walls of the GW-accumulator with those of the adjacent cRCP sections. Such an arrangement offers the option of saving both water and energy.

This example discloses a DoubleEPipe section with two HE-channels which are embedded within the special-blended (SB) concrete of the wall to provide thermal exchange with both the wasteflow and the adjacent soil and groundwater. The HE-channels of each such pipe section are further configured with inlet and outlet tubular extensions, each extending about 200 mm perpendicular to and outside the pipe exterior surface. The end extensions are further configured to emerge adjacent the bell and spigot ends respectively of the section. The tip of each extension is provided with a termination connector provided with a robust, tamper-evident cap for protection from damage and contamination. Similar to Example 1, the final channel connections between adjacent sections, and their integration into the supply and return manifolds for the known external HE-fluid circuits, should be completed as soon as the array of pipe sections is aligned in the trench bedding. In this way the combined operation of hydraulic and electronic components toward managing and controlling the HE-fluid temperature, flow rate and circulation path can be thoroughly tested. Optional manifold-cover devices are provided for selected section sizes and types whereby all the tested interconnections and sensors can be protected prior to and during trench backfill operations; optional known lifting fixtures may also be provided.

Careful design in sizing and positioning the reinforcement cages, especially the circumferential elements, to support the special-blended concrete surrounding the HE-channels is critical for this case; similar to Example 1, design and proof testing have been used to strengthen DoubleEPipe against spreading of tensile cracks, bar corrosion and spalling of cover material. The preferred-embodiment cage configuration for a 1044 mm cRCP pipe with 2 HE-channels is disclosed by data in TABLES 1 and 2, i.e., items beginning with the number 65; the features are also shown in FIGS. 4, 5, 6 and 7.

Centering and lateral-positioning of the outer reinforcement cage around the inner cage is an important functional design factor because having excessive concrete cover thickness between the HE-channel-2 and the adjacent earth and groundwater imposes a thermal penalty. Because the outer cage is typically shorter, it is possible to insert 3-4 removable "cage-centering devices" into the annular space from the spigot end. Once the outer cage is centered, sets of 4 C-type wire spacers (@90-degs. between) are attached between an outer L-steel and an inner L-steel, about every 300 mm of its length.

A second stage of positioning the outer reinforcement cage involves placement of all HE-channel extensions (2 each from inner and outer cages) through each respective opening in a fixed or removable mold-wall portion(s) [shells] which will form the concrete bosses on the external pipe surface at casting. For ease of making and testing of fluid connections for heat exchange, it has been found advantageous to align the boss axes, and those of all extensions, in a horizontal plane tangent to the pipe crown and perpendicular to the pipe axis; this configuration is shown in FIG. 4.

The data for each component indicate its particular positioning re the pipe axis and its critical dimensions; other data such as known material properties is covered in the related text above.

This example illustrates utilization of 1044 mm ID sections of cRCP pipe to be assembled into a typical application array such as a new HE District being added into the community sewer. Winter operational algorithms for cRCP with independent groundside HE-channels should be developed or adapted to determine whether HE-fluid exiting the wasteside channel of a particular section (or group of sections) at a particular moment can still collect heat by being directed into the groundside channel of an adjacent section (or group of sections). Similarly, a graywater accumulator (below), along with an optional local manhole for inspection, maintenance and HE-fluid routing, can be functionally incorporated into the array. The design of DoubleEPipe cages can be scaled for pipe ID in the range 1200-1800 mm and provided with inner and outer HDPE channels in the range 18-32 mm OD.

EXAMPLE 3 This example discloses a graywater accumulator (cGWA) coordinated with cRCP for Modern Buildings occupied by 100-300 persons. In some locations, drain systems for new apartments, dormitories, hotels or hospitals are already being designed to separate such liquid-only waste streams. By use of a HE-adapted graywater accumulator according to the present invention, (cGWA), it is practical to exchange heat locally with GW being recaptured from a new neighborhood or residential building and before its local treatments-and-reuse. The accumulator and its integrated HE features is connected and operated as an additional below-grade cRCP section. Because the GW stream is basically a warm, single-phase liquid, recapture of heat from the just-filled accumulator is probably the most efficient from overall energy considerations. In winter, provision would have to be made for transfer of liquid, post-heat-exchanged GW to separate, additional holding and processing facilities; it is anticipated that the accumulator is also configured to empty, along with the BW, into the local waste system.

The cGWA is also projected as a special cRCP section adapted to handle heat-exchange with single-phase waste streams in the cases where the building design provides separate drain lines for GW and BW. Although the form is illustrated as a vertical cylinder in FIG. 9, a horizontal array of cRCP-pipe sections configured with the same "holding volume", a transfer pump and same HE-channel area would offer similar thermal-exchange benefits along with possibility for water recovery. TABLES 1 and 2 describe the key accumulator features and provide particular dimensions.

Volume: The cGWA is designed as a cRCP section sized to contain about 100 dm$^3$ per occupant-person-served and the HE-fluid is managed to exchange heat in concert with related adjacent cRCP sections. Local license regulations typically cover the GW outflow labeling and connections into the local reuse systems. The present HE-adapted GW-accumulator is also configured to discharge into the sewer lateral as needed.

Discharge & Agitation: Because some GW streams may include small amounts of dispersed matter, a known jet or blade agitator in the accumulator interior may be appropriate on a continuous or intermittent schedule. Known fluid pumps and auger conveyor may also be installed in the discharge port of the accumulator.

Sensors: The incoming and discharge GW stream temperature and flow rate data required for its HE-management is measured at least as frequently as every 1-2 min, by known devices appropriately mounted and in communication with the local control network for HE-fluid switching. Sufficient discharge is management-triggered by the system prior to beginning of surges on the basis of prior TOD patterns; this traps the warm GW in the accumulator for efficient heat extraction during the following time interval.

Heat Exchange Tube and Area: At least one wall-embedded HE-fluid channel(s): helix wound HDPE, pitch-75 mm, channel OD~25 mm, active channel length about 75 m, active HE area for HDPE~6 m$^2$.

Insulation: Since GW streams are typically warmer than about 290K, insulation of the present accumulator will significantly improve its energy-capture efficiency in winter seasons. Encapsulated solid materials such as perlite are appropriate; external vessel insulation should be about 2<RSI, m$^2$-K/W<10 (RSI is insulation R-value in SI units).

Manhole Option: Locating the accumulated volume of GW in a local manhole can also provide certain ease of access to the manifolds serving the adjacent buried cRCP sections of the waste lateral.

Inspection & Maintenance: Such cGWA would require regular inspections and required-known sanitary controls, e.g. UV lamps, $Cl_2$ or $Br_2$ injections and known safety interlocks on discharges, i.e., timing, temperature, duration and flow rate.

TABLE 1

Basic Indicia

| | |
|---|---|
| cGWA | graywater accumulator, (GW), general horiz. or vert. orientation |
| 20 | heat exchange system |
| 21 | air inside the building |
| 22 | heat pump assy. |
| 23 | building |
| 24 | heat exchanger |
| 26 | heat exchange fluid |
| 28 | elongate pipe bodies, cRCP sections, custom designed for specific purpose |
| 30 | cRCP cylinder wasteflow area |
| 30a | cylinder pipe inside radius, mm |
| 30b | cylinder pipe outside radius, mm |
| 30c | cylinder pipe min. wall thickness, mm |
| 31 | alt. non-cylinder wasteflow-pipe profile |
| 32 | fluids, HEF |
| 38 | ground-loop manifolds for supply and return |
| 40 | pumps |
| 42 | heat transfer medium |
| 44 | cage steel, wire, mesh or rods |
| 45 | cage radial spacer |
| 46 | pipe portion |
| 47 | concrete reinf. fibers, metal, ceramic, polymers or other |
| 48 | spec. batch concrete, SB |
| 48a | SB molding processes |
| 48b | SB hydration processes |
| 49 | pipe assemblies, array |
| 57 | wall-exterior boss for HE channel |
| 58 | heat-exchange (HE) channel, HEC |
| 58a | HE channel tie point to C-steel or L-steel |
| 58c | HE channel extension |
| 58d | HE-channel inlet, wasteside or groundside |
| 58e | HE-channel outlet, wasteside or groundside |
| 59 | fluid-manifold protective cover |
| 59a | socket for manifold cover-anchor post |
| 60 | channel polymer material &properties |
| 64 | Single EPipe cage |
| 65 | Double EPipe cage |
| 66a1 | elliptical cage minor axis |
| 66a2 | elliptical cage major axis |
| 67 | anchor post for manifold cover |
| 72a | HE-fluid supply manifold |
| 72b | HE-fluid return manifold |
| 74x | inflow of section X |
| 74y | inflow of section Y |
| 76x | outflow of section X |
| 76x | outflow of section Y |
| 81h | GW accumulator, horizontal |

TABLE 2

Indicia for EMBODIMENTS

| Indicia | Meaning | Value | Typ. Range |
|---|---|---|---|
| INTrad_64 | SingleEPipe Inside radius, mm | 150 | 150-600 |
| | nom. inner cover thickness, mm | 49 | 25-35 |
| 64a0 | Layer-1 bottom, radius mm | 199 | 150-500 |
| 64a1 | L-steel CL radius, mm | 201 | 190-510 |
| 64a2 | theo. L-steel count N1 | 8 | 8-25 |
| 64a3 | HE-channel helix, CL radius mm | 213 | 200-525 |
| 64a4 | L-steel. area, mm2 | 19 | 12-26 |
| 64a5 | C-steel CL radius, mm | 206 | 190-510 |
| 64a6 | C-steel area, mm2 | 19 | 12-26 |
| 64a7 | C-steel helix pitch, mm | 76 | 60-150 |
| 64a8 | HE-channel helix pitch, mm | 76 | 60-150 |
| 64a9 | HE-channel OD, mm | 19 | 18-30 |
| | nom. outer cover thickness, mm | 22 | 25-35 |
| OUTrad_64 | SingleEPipe Outside radius, mm | 245 | 225-650 |
| INTrad_65 | DoubleEPipe Inside radius, mm | 522 | 500-900 |
| | nom. cover-1 thickness, radius mm | 28 | 25-50 |
| 65-0 | Layer-1 bottom, radius, mm | 550 | 525-800 |
| 65a1 | L-steel 1, CL radius, mm | 552 | 550-850 |
| 65a2 | C-steel 1, helix CL radius, mm | 557 | 550-850 |
| 65a3 | HE-channel helix 1, CL radius, mm | 565 | 550-850 |
| 65a4 | radial wire spacing, 65-0 to 65-00, mm | 49 | 40-60 |
| 65-00 | Layer-2 bottom, radius, mm | 599 | 575-850 |
| 65a5 | L-steel 2 CL radius, mm | 601 | 600-650 |
| 65a6 | C-steel 2, helix CL radius, mm | 606 | 600-900 |
| 65a7 | HE-channel helix 2, CL radius, mm | 613 | 600-900 |
| | nom. cover-2 thickness, radius mm | 25 | 25-50 |
| OUTrad_65 | DoubleEPipe Outside radius, mm | 647 | 600-1000 |
| 65a8 | L-steel 1 count (or spacing, mm) | 17 | (95-150) |
| 65a9 | L-steel 2 count (or spacing, mm) | 17 | (95-150) |
| 65a10 | L-steel 1 area, mm$^2$ | 32 | 30-50 |
| 65a11 | L-steel 2 area, mm$^2$ | 32 | 30-50 |
| 65a12 | C-steel 1 helix pitch, mm (or spacing, mm) | 76 | (70-150) |
| 65a13 | C-steel 2 helix pitch, mm (or spacing, mm) | 76 | (70-150) |
| 65a14 | C-steel 1 area, mm2 | 32 | 30-50 |
| 65a15 | C-steel 2 area, mm2 | 32 | 30-50 |
| 65a16 | HE-channel helix 1 pitch, mm (or spacing, mm) | 76 | (70-150) |
| 65a17 | HE-channel helix 2 pitch, mm (or spacing, mm) | 76 | (70-150) |
| 65a18 | HE-channel-1, OD, mm | 19 | 18-32 |

TABLE 2-continued

Indicia for EMBODIMENTS

| Indicia | Meaning | Value | Typ. Range |
|---|---|---|---|
| 65a17 | HE-channel-2, OD, mm | 19 | 18-32 |
| 81 | GW Accumulator (GWA), typical vert. embodiment | | |
| 81a1 | GWA volume filled, m3 | 5 | 3-10 |
| 81a2 | GWA wall thickness, mm | 130 | 125-150 |
| 81a3 | GWA HE-channel, active length, m | 80 | 75-85 |
| 81a4 | GWA HE-channel OD, mm | 25 | 18-35 |
| 81a5 | GWA HE-channel helix pitch, mm | 76 | 70-90 |
| 81a6 | GWA external insulation RSI, (m2-K)/W | 5 | 2-10 |
| 81b | GW inlet port | | |
| 81c | GWA discharge pump & port | | |
| 81d | GWA pump outlet port to GW system | | |
| 81e | GWA pump outlet port to sewer | | |
| 81f | GWA pump-jet port | | |

We claim:

1. A bell-end-to-spigot-end sealingly interconnected array of advanced-design, buried, concrete-Single EPipe cylinder sections, disposed for gravity transport of human and other fluent wastes and especially purposed for heat transfer between a known heat-pump and connected circulation system for energy-transfer fluid of a first building with liquid and vapor wastes flowing within the sections from either an adjoining neighborhood or a second building, each section being purpose-sized for the defined-flow-rate waste stream being generated from either source, each section configured with at least one wall-integrated-heat-exchange channel coupled into the known circulation system, each section having an overall length in the range 1-5 m, and each section comprising:

a concrete pipe with an inner conduit radius (INTrad_64) about 150 mm;

said pipe-wall thickness range being about 0.09 to 0.16 of the pipe ID;

said concrete (48) being a particular Special-Batch [SB] including Portland-clinker cement and other additives prepared under special compounding conditions sufficient to preserve its homogeneity during molding into the cage held within a form especially adapted to mold features onto the cylinder exterior;

said concrete (48) including at least 10 w/o $CaCO_3$ added as fine-disperse powder particles smaller than 40 micrometers in diameter;

said concrete (48) including 0 to 1.8 kg/m³ of synthetic polyolefin macrofiber (47);

upon controlled, documented hydration for at least 25 days, said hydrated concrete (48) having a compression strength in the range 20<MPa<40;

said pipe provided with custom-designed reinforcement-cage elements encapsulated within said concrete wall and further configured to connect mechanically and thermally therewith, and thereby explicitly support, at least one HE-channel (58) of OD at least (64a9) and channel-wall thickness at least 1 mm integrated within the concrete wall of said section and connected externally to said heat pump (40) for circulation of thermal-exchange fluid (42) between said array-sections and one of said sources (23);

said cage elements being one of: steel bar, wire or mesh having 250 yield strength, MPa<400;

said cage-elements including multiple, special-purposed circumferential and longitudinal members, C-steel and L-steel, sized to at least (64a6) and (64a4) respectively, joined together into a wall-encapsulated, adequately-covered, 3D cage construction sufficient to support the wall zones which may come under tension due to specific external loads and to prevent crack spreading within the concrete wall of said pipe;

said purposed L-steel members being aligned parallel to axis of said section between said pipe ends, positioned radially about said section axis at at least a distance (64a1), spaced apart circumferentially at least an angle 360/(64a2) and, together, having a combined sectional area (64a4) times (64a2);

said purposed C-steel members each being configured as a toroid-helix (64a5) centered about the section axis, extending as a wrap between said bell and spigot ends, spaced apart laterally at least a distance (64a7) and, each having an area at least (64a6);

said cage includes at least one HE-channel (58) having an outside diam at least (64a9), wrapped helically among said reinforcing steels, fixed at each turn thereto and extending generally lengthwise between said bell and spigot ends;

said HE-channel configured as a cylindrical helix at least (64a3) centered about the section axis with a pitch of at least (64a8) across the said section length;

said channel being made of bespoke HDPE tube (60) having a defined min. bend-curvature radius of about 500 mm, a TYS of at least 23 MPa at 23° C. and a wall thickness of at least 1.5 mm;

the available external-heat-transfer-area of each helix-turn of said channel of selected OD (64a9) embedded into said pipe section of (INTrad_64) is in the range 0.9<area, m²<1.5;

for the case of C-steel and HE-channel wrapped parallel with the same helix pitch over the bundle of L-steels, the thermal connection between these particular elements tied together is surface contact along entire active channel length;

said cage and channel components are further configured spatially to provide sufficient 3D layer spacing using an arrangement of radial spacers (45) fixed between the steel elements;

both ends of each said channel (58) are provided with wall-integral bosses (57) encompassing section-external extensions (58c) of terminal portions of said encapsulated channel(s), (58d) and (58e), which are configured during mold preparations to extend outward from the external surface of said final section a distance of at least 150 mm from the adjacent encapsulated tie point (58a);

the axis of each said channel extension (58c) being: [a] in a plane perpendicular to the section axis, [b] tangent to the helix axis of the adjacent encapsulated portion and [c] held at a curvature radius of at least 500 mm prior to final placement while the channel is fluid-pressurized during molding to at least 300 kPa;

whereby when a flow of thermal-exchange fluid is delivered by said heat pump into HE-channels of said sections of the array at a temperature different from that of said liquid and vapor waste streams flowing therein, heat can be exchanged with said adjoining neighborhood or designated building.

2. The concrete Single EPipe section of claim 1 wherein selected dimensional parameters are scaled upward according to performance of experimental prototypes wherein:

| | | |
|---|---|---|
| INTrad_64 | SingleEPipe Inside radius, mm | 187.5; |
| 64a1 | L-steel CL radius, mm | 236; |
| 64a3 | HE-channel helix CL radius, mm | 248; |
| 64a5 | C-steel CL radius, mm | 241; |
| OUTrad_64 | SingleEPipe Outside radius, mm | 282.5; | while other factors are sufficiently adjusted to higher values according to a minimal steel requirement:

| | | |
|---|---|---|
| 64a2 | theo. L-steel, sufficient count | 8-to-30; |
| 64a6 | C-steel, sufficient area, mm$^2$ | 18.7-to-20.3; | still other parameters are held constant:

| | | |
|---|---|---|
| 64a4 | L-steel area, mm$^2$ | 18.7; |
| 64a7 | C-steel helix pitch, mm | 76; |
| 64a8 | HE-channel helix pitch, mm | 76; |
| 64a9 | HE-channel OD, mm | 19; | and several factors are scaling results:

| | | |
|---|---|---|
| 64a0 | Layer-1 bottom radius, mm | 175-to-370; |
| | wall thickness, mm | 94-to-105; |
| | nom. inner cover thickness, mm | 25-40; |
| | nom. outer cover thickness, mm | 25-40; | and, for a pipe-section length of about 2.4 m, the resulting active HE channel-concrete contact area per section is about 2.6 m$^2$.

3. The concrete Single EPipe section of claim 1 wherein selected dimensional parameters are scaled upward according to performance of experimental prototypes wherein:

| | | |
|---|---|---|
| INTrad_64 | SingleEPipe Inside radius, mm | 286 |
| 64a1 | L-steel CL radius, mm | 334 |
| 64a3 | HE-channel helix CL radius, mm | 346 |
| 64a5 | C-steel CL radius, mm | 339 |
| OUTrad_64 | SingleEPipe Outside radius, mm | 381 | while other factors are sufficiently adjusted to higher values according to a minimal steel requirement:

| | | |
|---|---|---|
| 64a2 | theo. L-steel, sufficient count | 8-to-30; |
| 64a6 | C-steel, sufficient area, mm$^2$ | 18.7-to-20.3; | still other parameters are held constant:

| | | |
|---|---|---|
| 64a4 | L-steel. area, mm$^2$ | 19.2; |
| 64a7 | C-steel helix pitch, mm | 76; |
| 64a8 | HE-channel helix pitch, mm | 76; |
| 64a9 | HE-channel OD, mm | 19; | and several factors are scaling results:

| | | |
|---|---|---|
| 64a0 | Layer-1 bottom radius, mm | 175-to-370; |
| | wall thickness, mm | 94-to-105; |
| | nom. inner cover thickness, mm | 25-40; |
| | nom. outer cover thickness, mm | 25-40; | and, for a pipe-section length of about 2.4 m, the resulting active HE channel-concrete contact area per section is about 7.26 m$^2$.

4. The concrete Single EPipe section of claim 1 wherein selected dimensional parameters are scaled upward according to performance of experimental prototypes wherein:

| | | |
|---|---|---|
| INTrad_64 | SingleEPipe Inside radius, mm | 340 |
| 64a1 | L-steel CL radius, mm | 388 |
| 64a3 | HE-channel helix CL radius, mm | 400 |
| 64a5 | C-steel CL radius, mm | 394 |
| OUTrad_64 | SingleEPipe Outside radius, mm | 435 | while other factors are sufficiently adjusted to higher values according to a minimal steel requirement:

| | | |
|---|---|---|
| 64a2 | theo. L-steel, sufficient count | 8-to-30; |
| 64a6 | C-steel, sufficient area, mm$^2$ | 18.7-to-20.3; | still other parameters are held constant:

| | | |
|---|---|---|
| 64a4 | L-steel. area, mm$^2$ | 18.7; |
| 64a7 | C-steel helix pitch, mm | 76; |
| 64a8 | HE-channel helix pitch, mm | 76; |
| 64a9 | HE-channel OD, mm | 19; | and several factors are scaling results:

| | | |
|---|---|---|
| 64a0 | Layer-1 bottom radius, mm | 175-to-370; |
| | wall thickness, mm | 94-to-105; |
| | nom. inner cover thickness, mm | 25-40; |
| | nom. outer cover thickness, mm | 25-40; | and, for a pipe-section length of about 2.4 m, the resulting active HE channel-concrete contact area per section is about 5.2 m$^2$.

5. A bell-end-to-spigot-end sealingly interconnected array of advanced-design, buried, concrete Double EPipe cylinder sections, disposed for gravity transport of human and other fluent wastes and especially purposed for heat transfer between a known heat-pump and connected circulation system for energy-transfer fluid of a first building and liquid and vapor wastes flowing within the sections from either an adjoining neighborhood or a second building, each section being purpose-sized for the defined-flow-rate waste stream being generated from either source, each section configured with at least one wall-integrated-heat-exchange channel coupled into the known circulation system, each section having an overall length in the range 1-5 m, and each section comprising:
  a concrete pipe with an inner conduit radius (INTrad_65) about 522 mm;
  said pipe-wall thickness range being about 0.09 to 0.16 of the pipe ID;
  said concrete (48) being a particular Special-Batch [SB] including Portland-clinker cement and other additives prepared under special compounding conditions sufficient to preserve its homogeneity during molding into the cage held within a form especially adapted to mold features onto the cylinder exterior;
  said concrete (48) including at least 10 wt. % CaCO$_3$ added as fine-disperse powder particles smaller than 40 micrometers in diameter;
  said concrete (48) including 0 to 1.8 kg/m$^3$ of synthetic polyolefin macrofiber (47);
  said hydrated concrete (48) having a compression strength in the range 20<MPa<40;

said pipe provided with 2 concentric reinforcement cage
  layers encapsulated within said concrete wall and each
  layer further configured to connect mechanically and
  thermally with, and thereby explicitly support, at least
  one HDPE channel (58) of wall thickness at least 1 mm;
said channels being RE-channel-1 of OD (65a18) and
  HE-channel-2 of OD (65a17), both being integrated
  within the concrete wall of said section and connected
  externally to said heat pump (40) for circulation of
  thermal-exchange fluid (42) between said array-sec-
  tions and one of said sources (23)
said steel cage elements being one of: bar, wire or mesh
  having 250<yield strength, MPa<400;
said cage-elements including:

| | | |
|---|---|---|
| (65-0) | Layer-1 bottom radius, mm | 550; |
| (65a1) | L-steel 1, helix CL radius, mm | 552.44; |
| (65a2) | C-steel 1, helix CL radius, mm | 557.32; |
| (65a3) | HE-channel helix 1, CL radius, mm | 564.82; |
| (65a4) | radial layer spacing, 65-0 to 65-00, mm | 49; |
| (65-00) | Layer-2 bottom, radius, mm | 599; |
| (65a5) | L-steel 2 CL radius, mm | 601.44; |
| (65a6) | C-steel 2, helix CL radius, mm | 606.32; |
| (65a7) | HE-channel helix 2, CL radius, mm | 613.38; |
| (65a8) | L-steel 1 count | 17 |
| (65a9) | L-steel 2 count | 17 |
| (65a10) | L-steel 1 area, mm$^2$ | 32.2 |
| (65a11) | L-steel 2 area, mm$^2$ | 32.2 |
| (65a12) | C-steel 1 helix pitch, mm | 76 |
| (65a13) | C-steel 2 helix pitch, mm | 76 |
| (65a14) | C-steel 1 area, mm$^2$ | 32.2 |
| (65a15) | C-steel 2 area, mm$^2$ | 32.2 |
| (65a16) | HE-channel helix 1 pitch, mm | 76 |
| (65a17) | HE-channel helix 2 pitch, mm | 76 |
| (65a18) | HE-channel-1, OD, mm | 19 |
| (65a17) | HE-channel-2, OD, mm | 19 | said C-steel and L-steel cage elements respectively, joined
  together into a wall-encapsulated, adequately-covered,
  3D cage construction sufficient to support the wall
  zones which may come under tension due to specific
  external loads and to prevent crack spreading within the
  concrete wall of said pipe;
said purposed L-steel members being aligned parallel to
  axis of said section between said pipe ends, positioned
  radially about said section axis at distances (65a1) and
  (65a5), spaced apart circumferentially at angles 360/
  (65a8) and 360/(65a9), together, having a combined
  sectional area (65a10)*(65a80 and (65a11)*(65a9);
said purposed C-steel members each being configured as
  a toroid-helix (65a2) and (65a6) centered about the
  section axis, extending as a wrap between said bell and
  spigot ends, spaced apart laterally at distances (65a12)
  and (65a13), each having an area (65a14) and (65a15);
said reinforcement structure includes at two HE-channels
  (58) each having an outside diam (65a18) and (65a17),
  wrapped helically among said reinforcing steels, fixed
  at each turn thereto and extending lengthwise between
  said bell and spigot ends;
each of said HE-channels configured as a cylindrical helix
  (65a3) and (65a7) centered about the section axis and
  spaced laterally along said length at (65a16) and
  (65a17);
said channels being made of bespoke HDPE tube (60)
  having a defined min. bend-curvature radius of about
  500 mm, a TYS of at least 23 MPa at 23° C. and a wall
  thickness of at least 1.5 mm;
the available external-heat-transfer-area of each helix-
  turn of each said channels of selected OD (65a3) and
  (65a6) embedded into said pipe section of (INTrad_65)
  is in the range 3.5<area, m$^2$<3.7;
for the case of C-steel and HE-channel wrapped parallel
  with the same helix pitch over the bundle of L-steels,
  the thermal connection between these particular ele-
  ments tied together is surface contact along entire
  active channel length;
said cages and channel components are further configured
  spatially to provide 49 mm of radial layer spacing
  (65a4) using planar sets of 4 radial spacers (45) ori-
  ented 90 deg. apart, distributed along the pipe length
  and fixed between selected L-steel elements;
the planes of said radial spacers being orthogonal to the
  pipe axis and separated by a distance of about 300 mm;
both ends of each said channel (58) are provided with
  wall-integral bosses (57) encompassing pipe-external
  extensions (58c) of terminal portions of said encapsu-
  lated channel(s), (58d) and (58e), which are configured
  during mold preparations to extend outward from the
  external surface of said final section a distance of at
  least 150 mm from the adjacent encapsulated tie point
  (58a);
the axis of each said channel extension (58c) being: [a] in
  a plane perpendicular to the section axis, [b] tangent to
  the helix axis of the adjacent encapsulated portion and
  [c] held at a curvature radius of at least 500 mm while
  the channel is fluid-pressurized during molding to at
  least 300 kPa;
whereby when a flow of thermal-exchange fluid is deliv-
  ered by said heat pump into HE-channels of said
  sections of the array at a temperature different from that
  of said liquid and vapor waste streams flowing therein,
  heat can be exchanged with said adjoining neighbor-
  hood or designated building.

6. The concrete Double EPipe section of claim 5, wherein
selected dimensional parameters are scaled to larger values
according to performance of experimental prototypes
wherein:

| | | |
|---|---|---|
| (INTrad_65) DoubleEPipe inside radius, mm | | 759; |
| said pipe-wall thickness range being about 0.09 to 0.16 of the pipe ID; | | |
| (65a1) | L-steel 1, CL radius, mm | 800; |
| (65a2) | C-steel 1, helix CL radius, mm | 806; |
| (65a3) | HE-channel helix 1, CL radius, mm | 813; |
| (65a5) | L-steel 2 CL radius, mm | 849; |
| (65a6) | C-steel 2, helix CL radius, mm | 856; |
| (65a7) | HE-channel helix 2, CL radius, mm | 862; | while other factors are sufficiently adjusted to higher
  values according to a minimal steel requirement:

| | | |
|---|---|---|
| (65a8) | L-steel 1 count | 17-to-50; |
| (65a9) | L-steel 2 count | 17-to-50; |
| (65a10) | L-steel 1 area, mm$^2$ | 3-to-40; |
| (65a11) | L-steel 2 area, mm$^2$ | 3-to-40; |
| (65a14) | C-steel 1 area, mm$^2$ | 3-to-40; |
| (65a15) | C-steel 2 area, mm$^2$ | 3-to-40; | and still other parameters are held constant:

| | | |
|---|---|---|
| (65a12) | C-steel 1 helix pitch, mm | 76; |
| (65a13) | C-steel 2 helix pitch, mm | 76; |
| (65a16) | HE-channel helix 1 pitch, mm | 76; |
| (65a17) | HE-channel helix 2 pitch, mm | 76; |

-continued

| | | |
|---|---|---|
| (65a18) | HE-channel-1, OD, mm | 19; |
| (65a17) | HE-channel-2, OD, mm | 19; | and several factors are scaling results:

| | | |
|---|---|---|
| (65-0) | Layer-1 bottom radius, mm | 550-to-856; |
| (65-00) | Layer-2 bottom, radius, mm | 599-to-856; |
| (65a4) | radial layer spacing, 65-0 to 65-00, mm | 40-to-60; | a third elliptical layer cage may also be added;

welded-wire mesh, MW/MD25.8(W/D4), is substituted for L-steel and C-steel of the cages;

and, for a pipe-section length of about 2.4 m, and the resulting active HE channel-concrete contact area (2 layers of HE-channel) per section is about 20 $m^2$.

* * * * *